United States Patent [19]
Nishi

[11] 3,915,651
[45] Oct. 28, 1975

[54] DIRECT DIGITAL CONTROL PIPETTE

[75] Inventor: Hiroshi Harold Nishi, Rockville, Md.

[73] Assignee: The United States of America as represented by the Secretary of State, Washington, D.C.

[22] Filed: Sept. 22, 1972

[21] Appl. No.: 291,180

[52] U.S. Cl. ............ 23/259; 23/253 R; 73/425.4 P; 73/425.6; 222/76; 222/333; 417/12
[51] Int. Cl.².. G01N 31/18; G01N 1/14; B01L 3/02
[58] Field of Search .................. 23/259, 292, 253 R; 73/425.4 P, 425.6; 222/76, 76 XR, 333, 333 XR; 128/236, DIG. 1; 141/25; 417/12

[56] References Cited
UNITED STATES PATENTS

| | | | |
|---|---|---|---|
| 2,650,256 | 8/1953 | Lingane | 23/253 R |
| 2,925,198 | 2/1960 | Healey | 23/253 R UX |
| 3,175,734 | 3/1965 | Heiss | 23/253 R X |
| 3,206,072 | 9/1965 | Mencken | 222/76 |
| 3,246,952 | 4/1966 | Dawe | 23/253 R |
| 3,319,840 | 5/1957 | Oehme et al. | 23/253 R UX |
| 3,489,524 | 1/1970 | Anthon | 23/253 R |
| 3,581,575 | 6/1971 | Butler | 222/76 X |
| 3,615,230 | 10/1971 | Barnick et al. | 23/253 R |
| 3,666,420 | 5/1972 | Paatzsch | 23/253 R |
| 3,737,251 | 6/1973 | Berman et al. | 417/12 |

OTHER PUBLICATIONS

H. V. Malmstadt et al., High–Precision Rapid Injection and Automatic Refill Pipet, Anal. Chem., Vol. 34, pp. 299–301 (Feb. 1962).

*Primary Examiner*—R. E. Serwin
*Attorney, Agent, or Firm*—Browdy and Neimark

[57] ABSTRACT

A direct digital control pipette is disclosed for the automation of ultramicro chemical analyses. The pipette consists of a syringe barrel equipped with a displacement rod of uniform diameter which is driven by a screw feed. The fluid volume is measured in relation to the length of the displacement rod. The screw feed is driven by a stepping motor which has the ability to control electromechanically the movements of the displacement rod in precise increments.

3 Claims, 4 Drawing Figures

U.S. Patent   Oct. 28, 1975   3,915,651
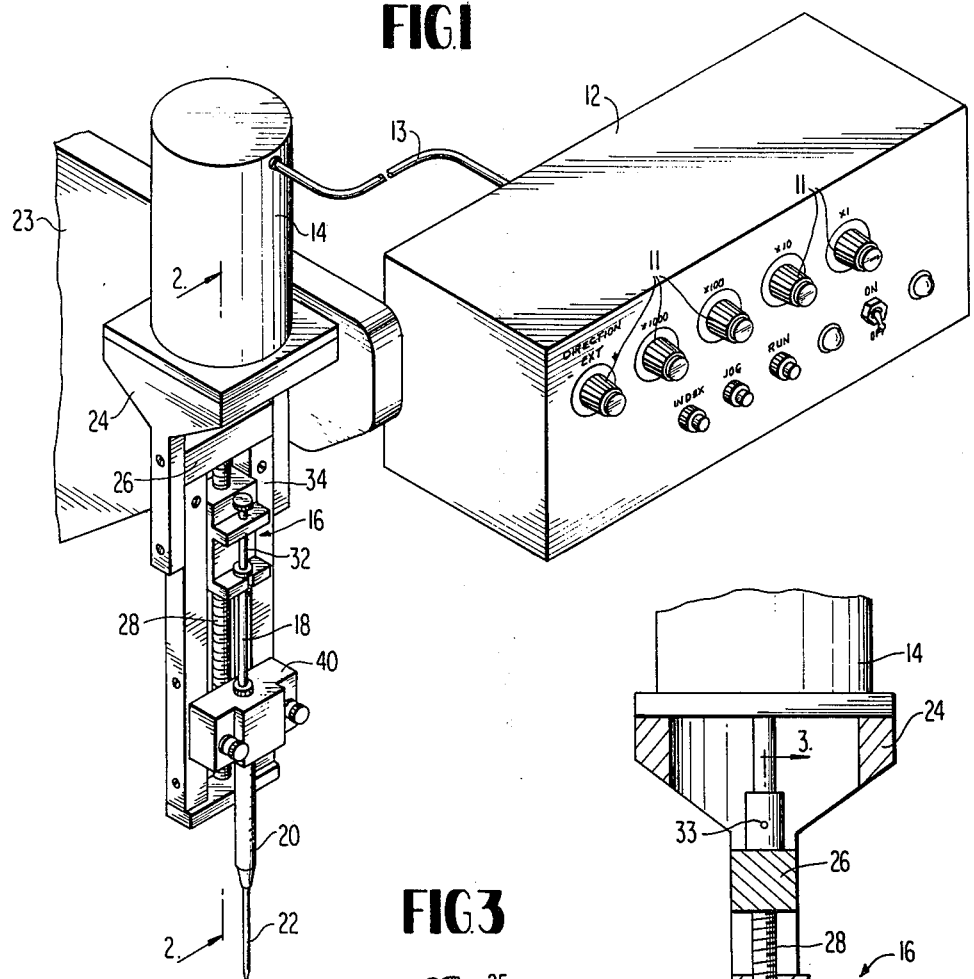
FIG.1
FIG.2
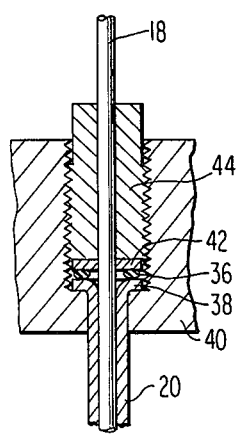
FIG.4
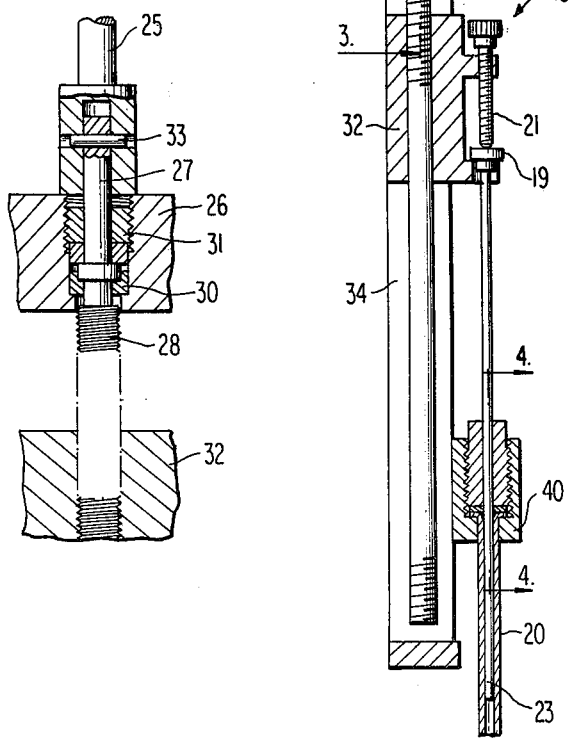
FIG.3

DIRECT DIGITAL CONTROL PIPETTE

FIELD OF THE INVENTION

The present invention relates to an automatic pipette and more particularly to a direct digital control pipette useful for the automation of ultramicro chemical analyses.

BACKGROUND OF THE INVENTION

There has long been a need in the medical laboratory analysis art for a discrete sampling ultramicro chemical analyzer system. The increasing number of requests for chemical tests for young children warrants automated equipment to process large work loads with accuracy and efficiency. A system that is capable of processing pediatric samples could be used to process all samples, including those requested as statistics. It is essential that such a system be simple to operate and have a high throughput. It is also essential that such an automated system can perform chemical analyses on 1 to 5 microliters of sample with a final test solution of 100 to 200 microliters. The unavailability of such a discrete sampling ultramicro chemical analyzer system was mainly due to the lack of instruments capable of measuring automatically very small quantities of fluid with satisfactory precision. Some requirements for such a pipette are that it be digitally controlled, that it should be compatible with automation and computer control and that it should measure fluid with a precision better than one-half of one percent at the 1 microliter level.

Prior art devices such as U.S. Pat. No. 3,206,072 to Mencken and U.S. Pat. No. 3,581,575 to Butler do not have sufficient precision due to the type of mechanical control mechanism used. In the Mencken device the length of travel of the plunger is controlled by discs or spacers which are flipped into position by a control mechanism. The device is relatively inaccurate because of play in the plunger lever drive mechanism. The spacers will also eventually become worn reducing the accuracy of the control device. In addition, the volume range which the device can deliver is limited by the possible spacer combinations which can be obtained. It cannot accurately deliver microliter quantities. The same general problems exist in the Butler device.

SUMMARY OF THE INVENTION

The present invention utilizes a microsyringe, the plunger of which is connected to a micrometer screw which is rotated by a stepping motor. The stepping motor is controlled by electrical pulses each pulse causing the rotor to rotate a precise number of degrees, e.g. 1.8° per pulse. A control mechanism determines how many pulses are required to depress the plunger the necessary distance to deliver the precise amount of fluid desired. The settings are virtually infinite because it is dependent upon rotor rotation rather than on mechanical stops. The device rotates very quickly because it is not necessary to move spacers or mechanical stops into position. To reverse the plunger, all that is necessary is to reverse the motor. The present invention preferably uses a direct connection between the drive motor and the plunger which increases accuracy and speed.

Accordingly, it is an object of the present invention to overcome the deficiencies of the prior art as indicated above.

It is another object of the present invention to provide for improved precision measuring and dispensing of microliter quantities of fluid.

It is a further object of the present invention to provide an automated pipette which is digitally controlled.

It is yet another object of the present invention to provide a direct digital control pipette which is compatible with automation and computer control.

It is still another object of the present invention to provide a direct digital control pipette which has a direct connection between the drive motor and the plunger to provide extremely high accuracy and speed.

It is still another object of the present invention to deliver precise discrete amounts of liquid with a precision better than one-half of one percent of the 1 microliter level.

These and other objects and the nature and advantages of the present invention will become more clear when reference is had to the following detailed description of a preferred embodiment in conjunction with the appended drawing.

BRIEF DESCRIPTION OF THE DRAWING

FIG. 1 is a perspective view of the direct digital control pipette of the present invention along with a control mechanism therefor.
FIG. 2 is a sectional view along line 2—2 of FIG. 1.
FIG. 3 is a sectional view along line 3—3 of FIG. 2.
FIG. 4 is a sectional view along line 4—4 of FIG. 2.

DESCRIPTION OF THE PREFERRED EMBODIMENTS

Referring now to the drawing, the direct digital control pipette of the present invention consists essentially of the following parts: An electronic pre-set indexer 12, a stepping motor 14, a screw slide assembly 16, a cylindrical displacement rod 18, a syringe barrel fluid reservoir 20 and a plastic pipette tip 22.

The electronic pre-set indexer 12 controls the stepping motor 14 and is connected to it through electrical leads 13. The motor 14 is mounted on a bracket 24 over the end plate 26 of one end of the screw slide assembly 16. Bracket 24 is in turn connected to a suitable support 23. The drive shaft 25 of the motor 14 is connected directly to the shank 27 of a micrometer lead screw 28 as is seen more clearly in FIG. 3.

The shank 27 of the lead screw 28 extends through the end plate 26 through a thrust bearing 30 and a lock nut 31. The lead screw 28 is directly connected to the drive shaft 25 of the motor 14 through a suitable connection such as pin 33.

The screw 28 is threaded through a slide 32 which is guided and supported in a dovetailed track, not shown, in the gib 34 of the slide assembly 16. The proximal end 19 of the displacement rod 18 is secured onto the slide 32 as, for instance, by means of screw 21. Thee distal end 23 of the rod 18 is introduced into the syringe barrel fluid reservoir 20.

In FIG. 4 it can be seen that the flange 38 of the syringe barrel 20 is clipped into a plastic block 40 which is affixed to the lower end of the slide assembly 16. A lock plug 44 holds a washer 42 in place against a fluid-tight seal 36 which may be constructed from polytetrafluoroethylene (Teflon). The luer fitting end of the syringe barrel 20 is equipped with a plastic pipette tip 22 preferably made of an inert material such as Teflon or polyethylene tubing.

In operation, the preset-indexer 12, which is well-known in the electronic art and will not be considered in detail herein but may be, for example, Type FT 1800 B-4, manufactured by the Superior Electric Company, Bristol, Connecticut, activates and indexes the stepping motor 14. The stepping motor 14 may be any of a number of commercially available stepping motors which provide exact incremental movement of the drive shaft 25 for each individual electrical impulse provided the motor 14. In the present disclosure, a stepping motor which will make one complete revolution of the drive shaft 25 for each 200 energizing pulses therefor is used. Such a stepping motor is manufactured by the Superior Electric Company as Type HS 25. Depending on the angular excursion of the motor shaft 25 desired, the appropriate number of pulses is preset on the decade dials 11 of the indexer 12. A command signal in the form of a switch closure initiates the pulses to rotate the motor shaft 25 in steps. When the count of preset pulses is completed, the rotation of the shaft stops. Each pulse induces the motor shaft 25 to rotate the lead screw 28 of the slide assembly 16 1.8° or 1/200 of 360° in the selected direction. If the lead screw 28 has, for example, forty threads per inch, the rotation of the lead screw 28 imparts a linear motion of the screw slide 32 to move 1/200 of 1/40 of an inch (0.00317 millimeters). Depending on the direction of rotation selected, the movement of the screw slide 32 transmits the linear motion to the displacement rod 18 which then moves out of or into the fluid reservoir 20 causing displacement or disposal of the fluid.

The total number of pulses required by the motor 14 to measure a specific volume is determined by dividing the total length of displacement of the displacement rod 18 by the length of its displacement per pulse or 0.00317 millimeters. The total length of displacement is obtained from the formula for the volume of a cylinder $\pi r^2 L$ = volume (L = volume/$\pi r^2$). The number of pulses required to deliver a specific volume can also be determined by weighing the water discharged by 1,000 pulses to the motor 14. The number of pulses required is equal to the specific volume multiplied by 1,000 then divided by the weight of the water. For smaller volumes, 500 pulses may be used instead of 1,000.

It is generally felt that inaccuracies in pipetting volumes of samples are probably the largest sources of error in ultramicro chemical analysis. For this reason, one of the first prerequisites in the development of an automated ultramicro chemical analytical system is the consideration of its ability to measure samples and reagents accurately with good precision. The use of the direct digital control pipette of the present invention will help in the design and the fabrication of future systems utilizing microliter volumes of fluid. Furthermore, the incorporation of the pipette in accordance with the present invention will improve the overall precision of existing analytical techniques where precision depends almost entirely on care used in measuring repetitive volumes of samples and reagents.

It will be obvious to those skilled in the art that various changes may be made without departing from the scope of the invention and the invention is not to be considered limited to what is shown in the drawings and described in the specification.

What is claimed is:

1. An automatic pipette for use in precision measuring and dispensing of microliter quantities of fluid comprising:
   a reversible stepping motor means for causing the exact incremental movement of a driveshaft thereof for each individual electrical impulse received thereby;
   indexer means for supplying a preset number of said individual electrical impulses to said stepping motor means;
   screw slide means connected to the driveshaft of said stepping motor means for converting the rotary motion of said driveshaft to rectilinear motion;
   a displacement rod connect to said screw slide means such that the rectilinear motion thereof causes rectilinear movement of said displacement rod; and
   fluid reservoir means for storing fluid, having an opening therein for receiving and dispensing fluid, and having means therein for receiving one end of said displacement rod such that the amount of fluid stored therein is dependent upon the length of said displacement rod therein.

2. An automatic pipette in accordance with claim 1, wherein said slide means includes means for securing one end of said displacement rod thereto and said displacement rod is secured to said slide means thereby.

3. An automatic pipette in accordance with claim 1, wherein said fluid reservoir means further includes a pipette tip at the opening thereof.

* * * * *